Dec. 13, 1932.  O. J. HAWKINS  1,890,540
COMBINED METER HANGER AND TEMPLATE
Filed June 24, 1932   3 Sheets-Sheet 1
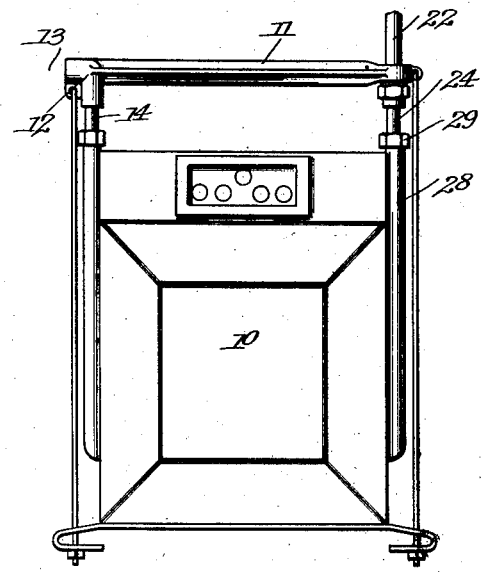
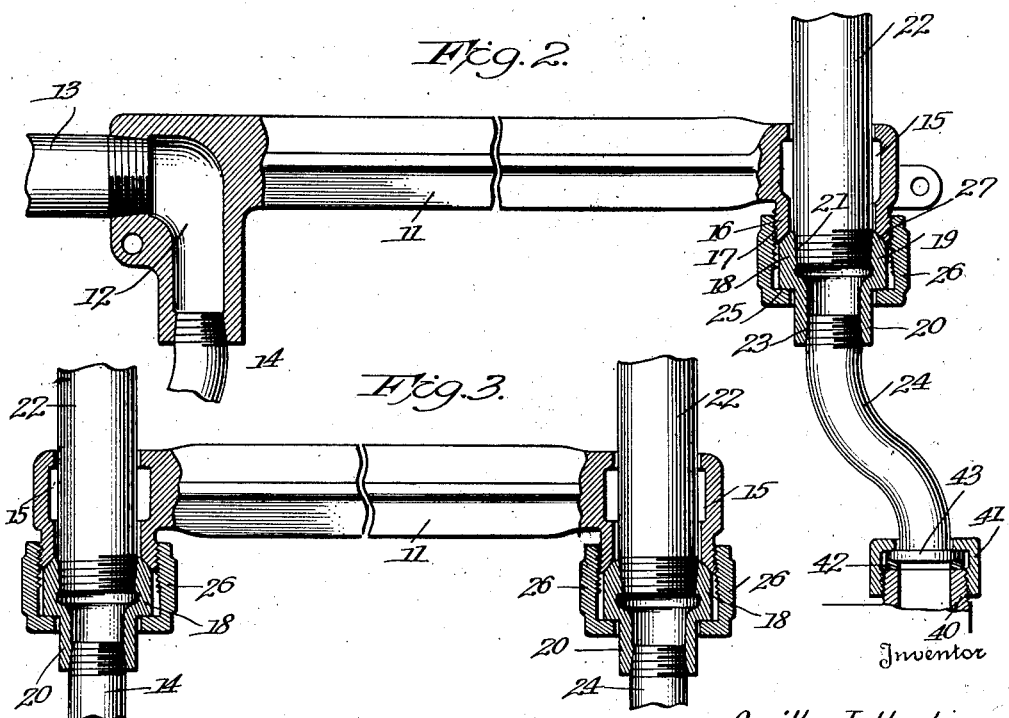
Inventor
Orville J. Hawkins

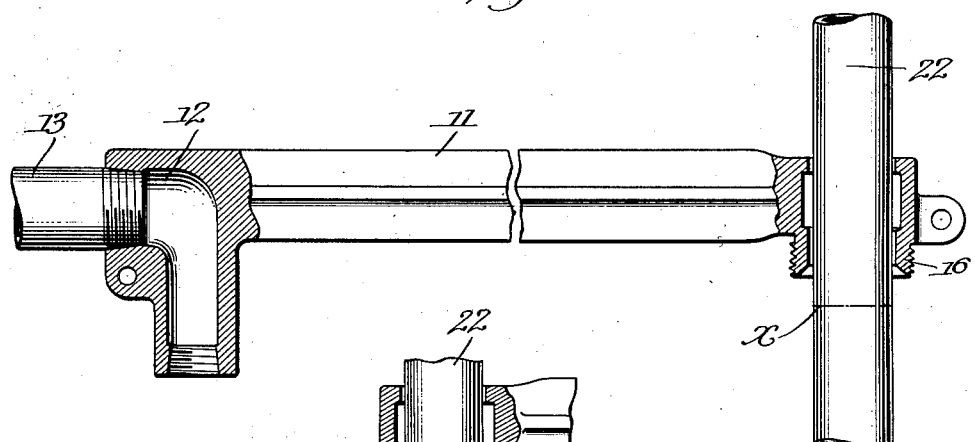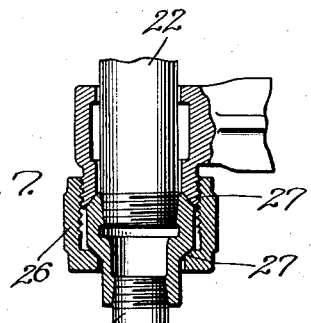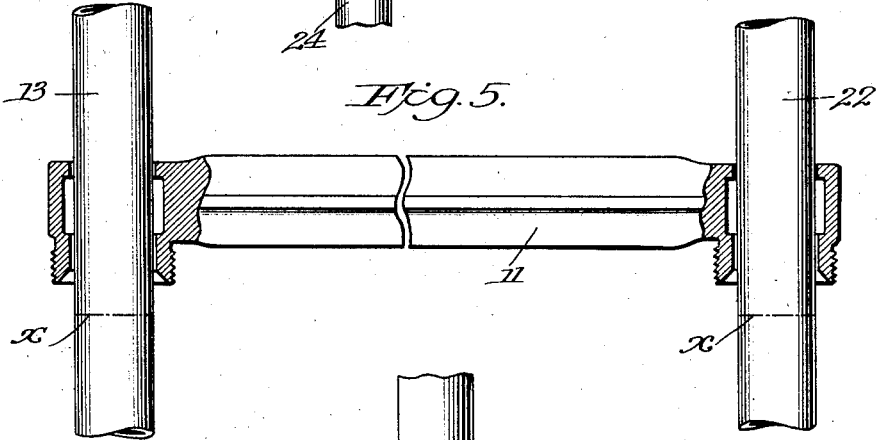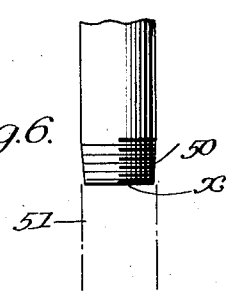

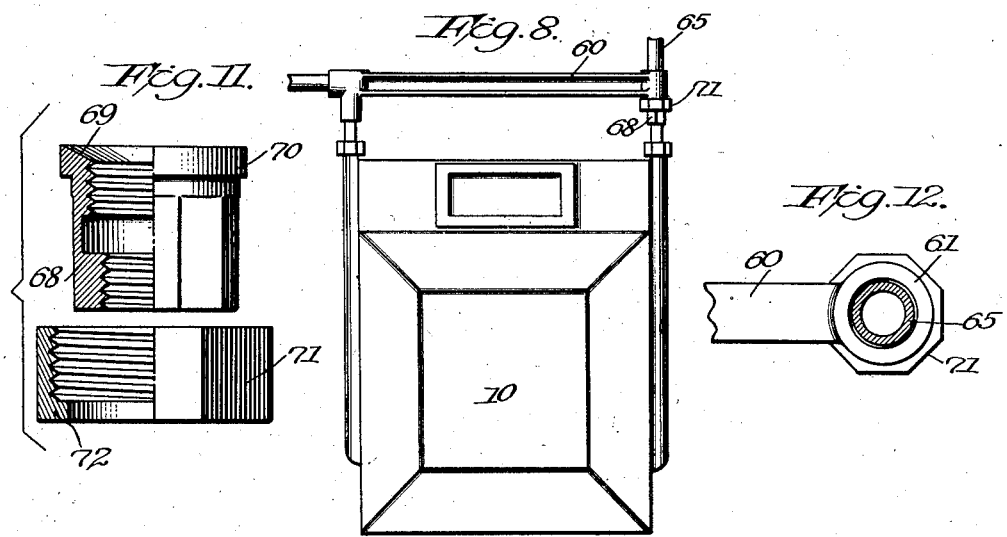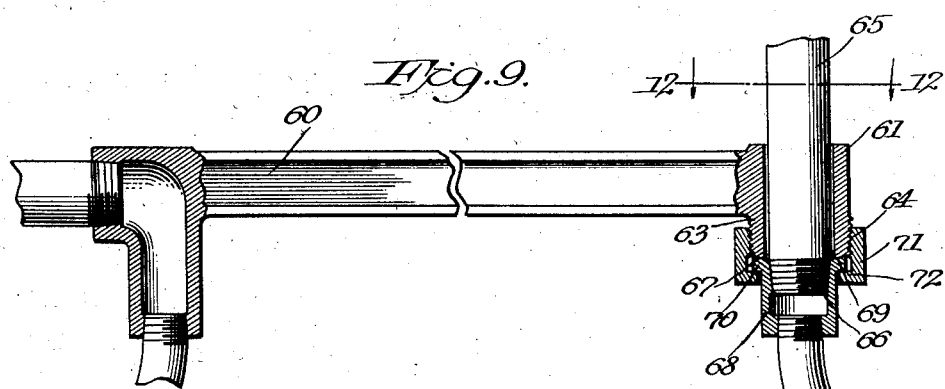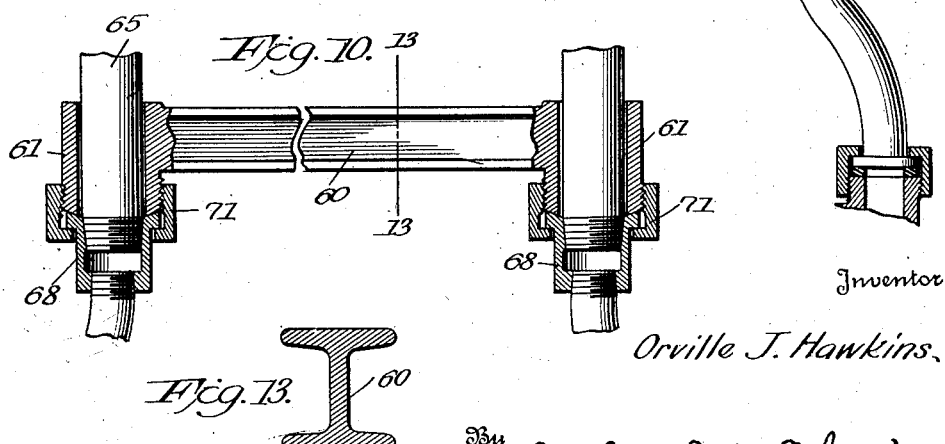

Patented Dec. 13, 1932

1,890,540

UNITED STATES PATENT OFFICE

ORVILLE J. HAWKINS, OF DECATUR, ILLINOIS, ASSIGNOR TO MUELLER CO., OF DECATUR, ILLINOIS, A CORPORATION OF ILLINOIS

COMBINED METER HANGER AND TEMPLATE

Application filed June 24, 1932. Serial No. 619,161.

My invention relates to meter hangers and particularly devices of the so-called rigid one-piece bar type.

The invention aims to produce a construction wherein the strains incident to the use of devices of this character are reduced and distributed so that notwithstanding that pipes may be out of alignment or there be varying rigid and satisfactory connection may be provided.

In this type of meter hanger, an offset coupling nipple is used, at the end of which is carried a union coupling provided with a flexible seat washer to make the joint against the spud of the meter.

With the new meter hanger of this invention slight misalignment of the service or supply pipes is corrected by the use of a connector which has a tapered seat contact with the meter bar to allow slight tilting of the connector.

The present invention is characterized by having the service pipes extend through the bar as distinguished from a sleeve positioned in an opening in the bar. With my construction, therefore, since the degree of misalignment of the pipes is limited to a permissible small amount by reason of the fact that the pipes extend through the openings in the ends of the bar, I am enabled to absorb the strain incident to the connecting up of the service and the meter pipes without causing any wear or stress upon the connections.

A further object of the invention is to have the service pipes extend through openings in the bar, whereby the end of the service pipes will be associated with the connector below the bar, and in this manner the threaded end of the pipe is prevented from breakage or disruption. Such an objection occurs where a sleeve is used and the pipe is threaded into the sleeve. In other words, with my invention the threaded portion of the pipe extending through the opening in the bar is protected by the rigid bar and the full thickness of the pipe is utilized to receive and absorb and distribute any strain at this point.

The flexible washer of the meter coupling enables a secure fluid-tight joint to be made at the meter, even though there be a slight angle between the end of the coupling and the meter spud.

A further object of the invention is to provide a very simple construction and one which will be relatively inexpensive, since hangers of this type are coming into universal adoption, and, moreover, to provide a structure which may be applied in a very short period of time, and by a workman who need not be particularly skilled.

The invention is particularly characterized by the absence of the so-called sleeve connections which are well known in the art, and which require that a very nice fit obtain between the sleeve and the opening in the bar, and hence the severe strains to which a hanger is subjected cannot be absorbed and very frequently results in breakage of the threaded ends of the service pipes. These sleeve constructions are satisfactory, but, in any case where the pipes are out of alignment, they present a very important difficulty.

A further object of the invention is to provide a meter hanger of the type described which will also be useful as a template. That is to say, the hanger can be associated with the service pipes and the service pipes cut and threaded to properly position the hanger for each particular installation where necessary.

In the drawings:

Fig. 1 is a front elevation.

Fig. 2 is a front elevation of the hanger with the connection at one end in section.

Fig. 3 is a front elevation of the hanger in which connections, such as shown in Fig. 2, are provided at both ends of the bar.

Fig. 4 is a view partly in section showing the installation of Fig. 2 and the improved hanger used as a template.

Fig. 5 is a view similar to Fig. 4 showing the hanger used as a template in connection with an installation such as shown in Fig. 3.

Fig. 6 is a view in detail to show the manner in which the pipe is cut and threaded to properly position the hanger.

Fig. 7 is a detail view showing the connector and a nut bevelled at their points of engagement.

Fig. 8 is a view of a modified form of hanger applied to a meter.

Fig. 9 is a detailed view partly in section showing the modified hanger.

Fig. 10 is a view similar to Fig. 9 and partly in section showing the improved construction applied at both ends of the hanger bar.

Fig. 11 is a detailed view of the connector and coupling nut used in connection with the construction shown in Figs. 8, 9 and 10.

Fig. 12 is a top view of the bar at one end.

Fig. 13 is a section through the bar.

Referring to the drawings, the numeral 10 indicates a meter, and the numeral 11 the bar of my improved construction.

This bar is preferably a rigid bar, i. e. in one piece, but it may be made of separate extensibly connected pieces as desired.

At one end of the bar in Figure 2 is the usual opening 12 which extends through the bar. The supply or service pipe 13 is threaded into the adjacent end of the opening 12, and the nipple 14, which leads to the meter is threadedly connected in the other end of the opening. In this manner communication is established to the meter at one side thereof.

At the other end of the bar is formed a transverse opening 15, and the bar is provided with an integral flange or extension 16 forming a continuation of the opening 15. Externally, the flange is threaded, as shown at 17. A connector 18 having an opening therethrough is employed and is formed with an enlarged portion 19 and a reduced portion 20. One end of the enlarged portion is preferably internally threaded at 21 for connection to the service pipe 22, and the other end is likewise internally threaded, as at 23, to receive the offset coupling nipple 24 similar to the nipple 14.

The enlarged portion of the connector 19 forms a shoulder 25 and engaging about this shoulder is a coupling nut 26 threaded to engage the threads 17 on the flange 16.

Preferably, the connector, when the parts are positioned, abuts the lower edge of the flange 16, and in the drawings I have shown these opposed edges as substantially bevelled, as shown at 27, so that the connector is centered with relation to the bar.

The hanger, as shipped from the factory, will consist of the bar 11 having the connection 12 at one end, and the connector and coupling nut associated with its opposite end. In some cases it may be desirable to initially connect the coupling nipples to the bar and market it in this manner.

In order to apply the invention, the coupling nut 26 is removed, and thereupon the connector 18 has its enlarged end threaded upon the service pipe 22. When the connection is established, it will be seen that the pipe 22 extends through the opening 15 and the flange which is coextensive therewith, and in this manner, the bar is supported by the connector 18, which, in turn, is supported by the pipe 22.

In other words, the threaded portion of the service pipe projects below the adjacent edge of the flange 16.

When the joint, as shown at 27, is established between the bevelled opposed edges of the connector and bar, the nut 26 is threaded upon the flange and draws the connector and bar together to center the connector with respect to the bar and support the parts in connected relation.

It will be seen that with the present invention, should the service pipes be out of alignment, nevertheless, by reason of the centering obtained, there will be no strain upon any of the parts or upon the bar or pipe, but, on the contrary, strain will be distributed. In this connection it will be noted that the bar rests upon the connector, and that the connector is supported through its threaded relation with the service pipe, and also by means of the coupling nut.

When a workman desires to position the invention at an installation, it is simply necessary to raise the bar about the pipe 22 and thread the connector with the adjacent end of the pipe to form a sealed joint. In this manner, it will be noted that the connector is always below the bar, and that the pipe extends through the opening 15 in the bar. This opening 15 preferably loosely receives the pipe 22, in that there is formed a sufficient amount of play to take care of any possible lack of alignment of the pipes and the pipe may tilt with respect to the walls of the opening.

After the connection between the service pipe and connector has been established, the nut 26 is screwed up to bring the bevelled surfaces 27 in abutting relation and center the fixture, as heretofore described. In this connection the opening in the lower end of the coupling nut is sufficiently enlarged to permit a small or required amount of tilting or play between it and the adjacent reduced portion 20 of the connector, and the same is true with respect to the enlarged portion of the connector and the coupling nut.

In Figure 3 of the drawings, I have illustrated a construction, wherein the connector and coupling nut are utilized at both ends of the bar to accomplish communication with the meter. In this adaptation the tilting and centering of the pipe with respect to the bar which is provided for by the invention is of equal importance.

When the connector and nut have been assembled in connected relation with the bar, the coupling nipples 24 and 14 may be threaded upon the lower end of the connector. These coupling nipples are usually malleable iron pipes and have their lower ends offset with respect to the bar, whereby they are connected up with the meter tubes 28, as shown at 29, in the desired manner.

The present invention avoids the use of any sleeved connections, and no expensive machining is necessary to provide a nice fit, but, on the contrary, the invention requires but two (2) parts, namely, the connector and coupling nut, which may be produced at relatively small expense, and, it will be noted, enable the installation to be made with a minimum of effort.

The enlarged portion 19 of the connector will be provided with a polygonal exterior to receive a wrench for threading the connector onto the pipe 22, and the reduced portion 20 will have a polygonal portion to receive a wrench as well.

It is also to be noted that the coupling nut, in addition to securing the connector to the bar, also has the function of guiding the connector in normal position, in that the interior wall of the nut is spaced from the exterior wall of the connector a proper distance to permit this as well as tilting of the connector.

With constructions utilizing a sleeve positioned in an opening in the bar, the service pipe is connected to the upper end of the sleeve and the nipple to the lower end thereof. Hence, all strains are communicated to or concentrated not upon the bar or to the service pipe protected by the bar as in the construction of the present invention, but at points of threaded connection of the pipes with the sleeve. Thus, in the prior art structures, since the sleeve is fixed, the strain acts on the connections to (1) crack the pipes (2) distort the threads, and (3) destroy the seal.

In the present invention, such possibilities are obviated, and, moreover, the joints between the connector and bar and nut need not be sealed, and hence the connector can be aligned with the pipes and without producing objectionable stresses.

In the drawings, I have illustrated the connector and bar as being in abutting relation and each having a bevelled contact surface to permit centering. The engagement of the nut and enlarged portion of the connector may have a similar bevelled connection, as shown in detail in Figure 7. In other words, the opposite ends of the enlarged portion of the connector will be suitably bevelled and the corresponding portions of the flange and the nut will be similarly formed or bevelled.

Referring to Figure 2, the offset nipple is connected to the meter spud 40 by means of a union coupling which comprises a nut 41 and a flexible washer 42.

With the new meter hanger of the present invention misalignment of the service or supply pipes is corrected by the use of the connector having the tapered seat contact with the meter bar, so as to allow tilting of the connector and also through the provision of the flexible washer 42 of the meter coupling which enables a secure fluid-tight joint to be made at the meter, notwithstanding there being a slight angle between the end of the nipple coupling and the meter spud. In other words, the flexible washer 42 upon which the flange 43 of the nipple engages, will accommodate slight tilting or misalignment of the nipple with respect to the normal vertical and fixed position of the meter spud 40, said washer also being of compressible material.

Referring to Figures 4, 5 and 6, I have illustrated the manner in which my improved meter bar acts as a template.

Referring to Figure 4, the pipe 13 is assembled with the opening 12 at that end of the bar and thereafter the service pipe 22 is passed through the bar and the bar is levelled. Thereupon, the end of the service pipe will be cut off at the point X and the portion thereof which extends below the end of the flange 16 is suitably threaded, as shown at 50 in Figure 6. In this manner, it will be noted that an operator can accomplish the installation without reliance upon a hit or miss computation, since in any case it is only necessary to level the bar, measure off an appropriate distance for the threaded portion of the pipe, sever the pipe at that point and thereafter thread the pipe to receive the connector.

The same operation will be carried on in connection with Figure 5 and I have illustrated in Figure 6 a diagram showing the threaded portion 50 and the severed portion of the pipe at 51.

This is a very decided advantage in that the correct allowance can be made for the thread and the length of the connector and the pipe then cut off at the proper length. In other words, by permitting the service pipe to extend through the opening in the bar, the rigid bar is used not only for seating the pipes in the correct plane, but also for proper spacing.

Referring to Figures 8, 9 and 10, I have illustrated a modified construction which is of equal value to that already described.

In this modified construction, the meter bar is in the form of an I-beam 60, formed at one or both ends with integral tubular sockets 61, the upper edge 62 of which may be flush with the upper flange of the I-beam, but preferably extends a slight distance above it as shown. The opposite end of the socket has an integral extended wall 63 forming a continuation of the opening in the socket 61 and threaded externally as shown at 64.

As with the previous construction described, the opening defined by the socket and extension is preferably slightly larger than the diameter of the service pipe 65 which is adapted to extend through the said opening and have its threaded portion 66 project below the lower edge of the wall of the extension 63.

This lower edge 67 of the extension 63 is bevelled as shown and adapted to make contact with the connector 68. The connector 68 has its upper flanged edge correspondingly bevelled as shown at 69 to substantially conform to the surface of the lower edge 67 of the extension 63.

This connector 68 is provided with a flange 70 at one end, and is hollow, as shown, being internally threaded adjacent each end to receive the service pipe 65 and the coupling nipple to establish communication with a meter.

A coupling nut 71 is threaded upon the threaded portion 64 of the extension 63 and has a flange 72 which engages the under-surface of the flange 70 of the connector to secure the connector to the bar, i. e., to maintain a contact between the opposed bevelled or otherwise formed surfaces 67 and 69 of the extension and connector respectively.

The opposed surfaces of the flange 70 of the connector and the flange 72 of the nut may likewise be substantially bevelled or formed as shown in Figure 7.

The construction shown in Figures 8, 9 and 10 is otherwise similar to that illustrated and described in connection with the other figures of the drawings, and it will be noted that the connector may be tilted or centered to accommodate any misalignment of the service pipes. Such misalignment will usually be slight but by reason of the constructions employed can be absorbed and distributed without strain upon the pipes, the connection, or the threads.

In this respect each of the constructions illustrated in the drawings is to be distinguished from a meter hanger wherein the sleeve is disposed in the opening and at its upper end is connected to the service pipes. Such a construction has been found to be disadvantageous in that by reason of misalignment of the pipes, the strain causes them to crack and the threads become ruptured.

The flange 70, as shown in Figure 11, is substantially smooth and ring-shaped, while the body portion of the connector is polygonal to receive a wrench.

The I-beam provides a very light and strong bar, and at its ends is formed with the integral sockets of greater cross-sectional diameter than the transverse dimensions of the flanges of the I-beam.

With any of the several structures disclosed in this case, there is no opportunity for stripping the threads of the pipe, since the pipe is sustained in the opening in the bar at the point where the greatest strain occurs. Hence, any possibility of cracking or bending of the pipe is avoided.

Various changes can be made in the construction illustrated, all of which are considered as comprehended in the appended claims.

I claim:

1. Means for spacing the service pipes of meters, comprising a bar having at one end thereof means for establishing communication with the meter and at the other end thereof means for receiving a pipe, means for connecting said pipe with a second pipe for establishing communication with the meter, said connecting means disposed in abutting relation to the bar, and means for securing the connecting means in such abutting relation.

2. Means for spacing the service pipes of meters comprising a bar having at one end thereof means for establishing communication with the meter and at the other end an opening through which a pipe extends, separable means for connecting said pipe with a meter nipple for establishing communication with the meter, said connecting means being disposed below the bar and in substantially abutting relation thereto and means for securing the connecting means in such abutting relation.

3. Means for spacing the service pipes of meters comprising a bar having at one end thereof means for establishing communication with the meter and at the other end means for receiving a pipe, means for connecting said pipe with a second pipe for establishing communication with the meter, said connecting means supporting the bar and being disposed in substantially abutting relation thereto, and means for securing the connecting means in such abutting relation.

4. Means for spacing the service pipes of meters comprising a bar having at one end thereof means for establishing communication with the meter and at the other end means for receiving a pipe, means for connecting said pipe with a meter nipple for establishing communication with the meter, said bar resting on said connecting means.

5. Means for spacing the service pipes of meters comprising a bar having at one end thereof means for establishing communication with the meter and at the other end an opening through which a pipe extends to have its free end disposed below the bar, a connector for threadedly connecting the free end of the pipe to a meter nipple for establishing communication with the meter, said connector being disposed in substantially abutting relation to the bar, and means engaging the connector and bar for maintaining such abutting relation.

6. Means for spacing the service pipes of meters, comprising a bar having at one end thereof means for establishing communication with the meter and at the other end thereof means for receiving a pipe, means for connecting said pipe with a second pipe for establishing communication with the meter, said connecting means disposed in abutting relation to the bar, the opposed surfaces of the bar and connecting means being substantially complementary, and means for securing the connecting means in such abutting relation, and for centering the connecting means with relation to the bar.

7. Means for spacing the service pipes of meters comprising a bar having at one end thereof means for establishing communication with the meter and at the other end an opening through which a pipe extends, a flange or extension on the bar, means for connecting said pipe with a meter nipple for establishing communication with the meter, said connecting means being disposed below the bar and in substantially abutting relation with the flange thereof, and means for securing the connecting means in such abutting relation.

8. Means for spacing the service pipes of meters comprising a bar having at each end thereof means for receiving a pipe, means for connecting each pipe respectively with a meter nipple for establishing communication with the meter, said connecting means disposed in substantially abutting relation to the bar, and means for securing the connecting means in such abutting relation.

9. Means for spacing the service pipes of meters comprising a bar having at one end thereof means for establishing communication with the meter and at the other end thereof an opening for receiving a pipe, means for connecting said pipe with a meter nipple for establishing communication with the meter, said means comprising a connector member enlarged at one end to define a shoulder, and means for securing said connector in abutting relation to said bar and comprising a coupling nut engaging said shoulder and said bar.

10. Means for spacing the service pipes of meters comprising a bar having at one end thereof means for establishing communication with the meter and at the other end thereof an opening through which a pipe extends, the wall of said opening defining a flange extending below the bar, a separable connector member enlarged at one end to define a shoulder adapted to engage the lower edge of said flange, and a coupling nut engaging said shoulder of the connector member and threaded on said flange for securing the connector in substantially abutting relation to the flange.

In testimony whereof I affix my signature.

ORVILLE J. HAWKINS.